July 2, 1963 H. S. INGHAM, JR 3,096,209
FORMATION OF SEMICONDUCTOR BODIES
Filed May 18, 1960
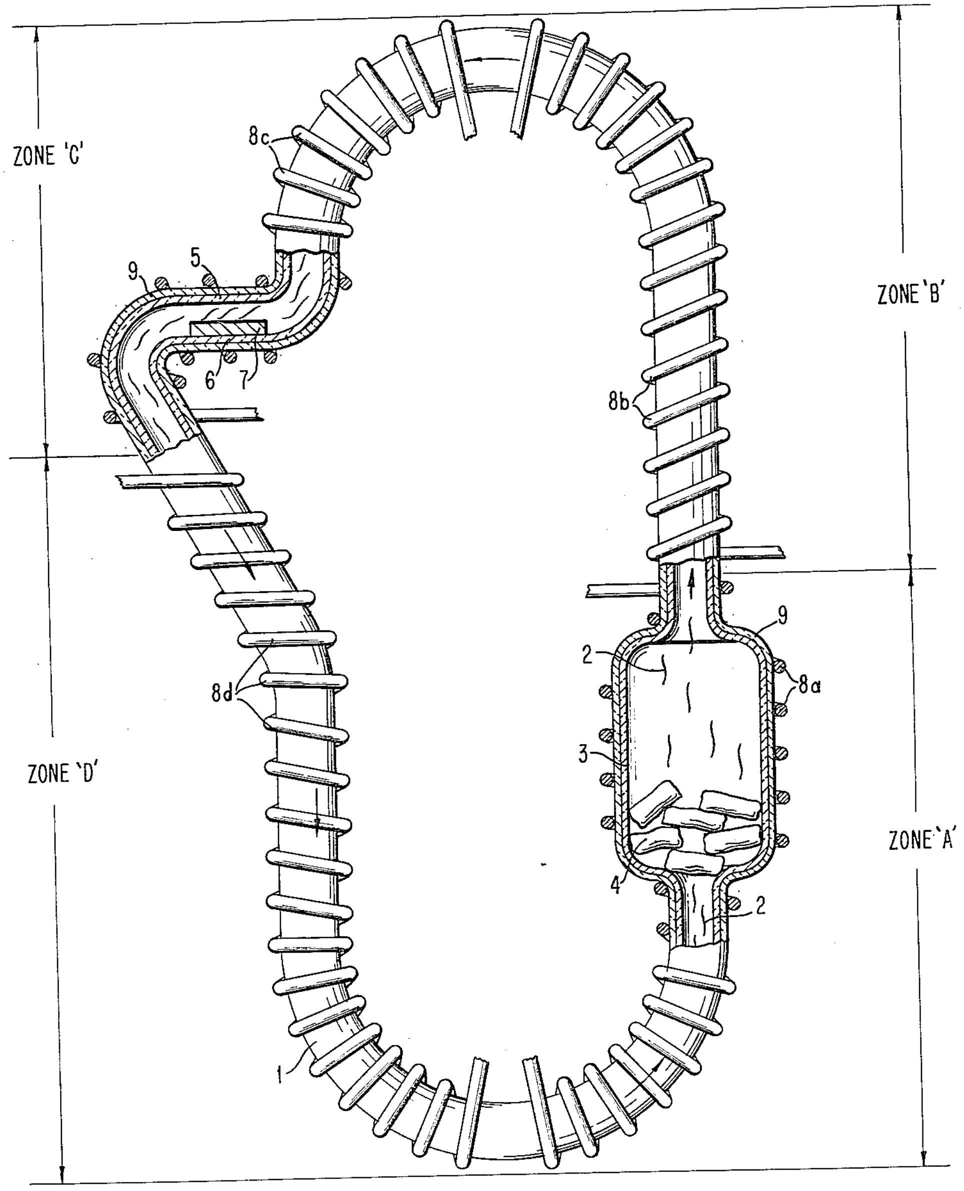
INVENTOR
HERBERT S. INGHAM JR.
BY John F. Ohlandt Jr.
ATTORNEY United States Patent Office 3,096,209
Patented July 2, 1963

3,096,209

FORMATION OF SEMICONDUCTOR BODIES

Herbert S. Ingham, Jr., Hillside Lake, Wappingers Falls, N.Y., assignor to International Business Machines Corporation, New York, N.Y., a corporation of New York Filed May 18, 1960, Ser. No. 29,836
1 Claim. (Cl. 117—201)

This invention relates to the formation of semiconductor bodies by vapor deposition and more particularly to an apparatus and a method for producing the deposition epitaxially at a higher rate and with a greater uniformity than has been previously attainable.

In the art of vapor deposition, a deposit on a substrate is said to be epitaxial if its crystal structure is of the same orientation and periodicity as the substrate.

A cyclical reaction technique for achieving epitaxial deposition has been previously developed. In essence, this technique involves the use of a closed straight tube containing a transport element, such as a halogen, a source of semiconductor material and a substrate of the same, or of a different, semiconductor material, upon which the semiconductor body is to be formed. In operation, a temperature gradient is established along the tube with a difference in temperature maintained between the source material zone and the substrate zone. A gaseous compound of the source material and the transport element forms in the source zone and diffuses to the substrate zone where it decomposes with the result that epitaxial deposits are formed on the substrate material. The rate at which the crystals can be grown in this closed tube apparatus is limited by the rate at which the vapors in the cyclical reaction can be transported from the source zone to the substrate zone and from the substrate zone to the source zone.

The present invention represents a significant improvement over the closed tube technique described above by reason of the approach taken to increasing the rate of transport of the vapors. The reaction container or furnace is designed in the form of a closed loop so that a continuous, undirectional flow path is established for the cyclical reaction. The source material and the substrate are positioned on opposite sides of the container so that when a controllable difference of temperature is established between the opposite sides, rapid circulation of the vapors is promoted due to convection. With this arrangement, the rate of flow of the vapors can be precisely controlled and can be varied within wide limits. As a result, the maximum rate of epitaxial deposition that may be achieved is no longer limited by the rate at which the vapors can be transported but only by the restrictions inherent in the physical mechanism of the crystal growth process itself.

It is, therefore, an object of the present invention to provide an improved vapor deposition technique for forming semiconductor bodies.

Another object is to provide a method of forming semiconductor bodies by which a high rate of epitaxial crystal growth may be obtained.

A further object is to provide an improved reaction apparatus for producing a high rate of epitaxial crystal growth.

Another object is to control the convection currents in the vapor deposition process.

A related object is to obtain an epitaxially deposited junction device.

The foregoing and other objects, features and advantages of the invention will be apparent from the following more particular description of a preferred embodiment of the invention, as illustrated in the accompanying drawings.

The FIGURE is an elevational view, partly in section of apparatus for forming semiconductor bodies in accordance with the invention.

In the ensuing discussion of a preferred embodiment of the invention, the operation will be described with reference to the use of germanium as both the source material and the substrate, and to the use of iodine as a transport element. It will be appreciated, however, that other semiconductors, such as silicon, may serve both as the source and as the substrate and that other transport elements may be employed. It will also be understood that in the fabrication of junction devices the conductivity type of the source and substrate will preferably differ. Likewise, the semiconductor source material may differ from the substrate material as long as the lattice constants of the source and substrate materials are reasonably similar in value.

Referring now to the FIGURE, there is shown a schematic diagram of the reaction apparatus in which utilization is made of the reversible chemical reaction:

$2GeI_2$ (vapor)$\leftrightharpoons GeI_4$ (vapor)+Ge (solid) for which at a given temperature and initial concentration of iodine, there exists an equilibrium proportion of $GeI_2$ to $GeI_4$ vapors over an excess of Ge. Deposition of the germanium requires transportation of the vapors from a hotter region (the source zone A) to a cooler region (the substrate zone C).

In the cooler region the above reaction proceeds to the right, resulting in epitaxial deposition of Ge on to a substrate crystal of Ge. The vapor becomes richer in $GeI_4$ and is then transported back to the source zone. There a source of Ge allows the reaction to go to the left. The process is thus cyclical and transports Ge from one zone to the other.

The quartz tube 1 containing the vapors 2 is in the form of a flattened toroid held in a vertical plane. The thickened portion 3, in zone A on the right side of the tube contains chunks 4 of source Ge. The elbow 5 on the left side of the tube contains a flat shelf 6 upon which rests a substrate Ge crystal 7. The existence of the elbow is not essential to the invention but is used to aid in controlling the temperature of the substrate. The tube is evacuaed and $I_2$ and, if desired, a carrier gas is introduced. The electric furnace windings 8*a*, 8*b*, 8*c*, and 8*d* are on sections of split quartz tubing 9 and fit concentrically around the toroid so that zones A, B, C and D may be maintained at various temperatures.

In a simple version of the apparatus the entire right-hand side of the toroid is maintained at a desired source zone temperature, typically about 650° C., by connecting the windings 8*a* and 8*b* in series to a source of power, not shown. The other side of the toroid is maintained at a typical substrate zone temperature of 400° C. by connecting windings 8*c* and 8*d* to a similar source of power. Because of the temperature difference between the two sides, there is a large convection current. Vapor rich in $GeI_2$ is transported around the top of the toroid to the substrate crystal 7. Ge is deposited in the substrate zone and the vapor proceeds around the bottom back to the source Ge 4 which replenishes the vapor with $GeI_2$. The convective flow is enhanced significantly, i.e. by about 30% for the temperatures quoted above and a pressure of about 0.3 atmosphere, by the fact that $GeI_4$ has a higher density than $GeI_2$ and exists in larger concentrations on the cooler side of the toroid.

In a modified version of the apparatus the windings 8*a* in zone A and windings 8*b* in zone B are separately connected to a source of power so that these individual zones may be maintained at different temperatures.

Thus, the modified version provides control of the convective flow rate independently of the difference in temperature between the source and substrate. Such control is useful for studies of the deposition process and for producing optimum growth rates and crystal quality.

In order to aid in understanding and practicing the invention and to provide a starting place for one skilled in the art, the following set of specifications is set forth below. It should be understood that no limitation should be construed hereby since in the light of the preceding description many sets of specifications may be devised. For example, other semiconductor materials and other transport elements may be utilized. In certain situations involving these other semiconductor materials and transport elements, it will be necessary to establish a reverse temperature profile, i.e. the substrate will be maintained at a higher temperature than the source. In such situations, of course, the flow of vapors will then be clockwise or opposite to the direction shown in the FIGURE.

| | |
|---|---|
| Container 1 (Quartz) | 11 inches long, 4 inches wide. |
| Heating windings 8*a*, 8*b*, 8*c*, and 8*d* | Nichrome wire. |
| Source 4 | Germanium—undoped. |
| Substrate 7 | Germanium—undoped. |
| Transport element | Iodine. |
| Temperatures: | |
| Zones A and B | 650° C. |
| Zones C and D | 400° C. |

The apparatus, in accordance with the above set of specifications, has been given tests, and a uniform epitaxial deposit approximately 0.35 mm. thick was obtained in 23 hours. This deposit rate of 15 $\mu$/hr. is about 3 times greater than the normal rate observed in conventional closed tubes. Furthermore, the deposit was more uniform than found in straight tubes. By increasing the cooling of the substrate by directing a jet of air on the elbow 5, deposition rates of 130 $\mu$/hr. were observed.

What has been described is a technique of vapor deposition involving the use of a closed-loop reaction apparatus whereby high rates of uniform epitaxial crystal growth may be obtained and whereby the rates of such growth may be easily regulated by reason of the precise control afforded over the convective flow of the vapors in the reaction.

While the invention has been particularly shown and described with reference to a preferred embodiment thereof, it will be understood by those skilled in the art that various changes in form and details may be made therein without departing from the spirit and scope of the invention.

What is claimed is:

The method of forming semiconductor bodies comprising the steps of providing a continuous closed loop reaction container in a vertical orientation, positioning in a first zone on one side of said continuous closed-loop reaction container a source of semiconductor material, positioning in a second zone on another side of said container at least one substrate of semiconductor material, providing in said container a transport element cyclically reactive with said source said substrate to produce vapors, maintaining between said first and second zones a difference in temperature to effect the cyclical reaction, and establishing between said second zone and a third zone, adjacent said first zone, another difference in temperature, whereby rapid circulation of the vapors is obtained independently of the temperature difference between the source and the substrate.

References Cited in the file of this patent

UNITED STATES PATENTS

| | | |
|---|---|---|
| 2,344,138 | Drummond | Mar. 14, 1944 |
| 2,621,120 | Pedersen et al. | Dec. 9, 1952 |
| 2,692,839 | Christensen et al. | Oct. 26, 1954 |